United States Patent [19]

Metcalf

[11] Patent Number: 4,751,988
[45] Date of Patent: Jun. 21, 1988

[54] TORQUE LIMITING AND OVERTRAVEL STOP DEVICE

[75] Inventor: Jeffrey D. Metcalf, Rockford, Ill.

[73] Assignee: Sundstrand Corporation, Rockford, Ill.

[21] Appl. No.: 812,925

[22] Filed: Mar. 17, 1986

[51] Int. Cl.$^4$ .............................................. F16D 67/00
[52] U.S. Cl. ....................................... 192/7; 192/141;
  192/143; 74/89.15; 74/412 TA; 74/424.8 B
[58] Field of Search ........ 74/89.15, 412 TA, 424.8 B,
  74/424.8 R; 192/141, 143, 7

[56] References Cited

U.S. PATENT DOCUMENTS

| | | | |
|---|---|---|---|
| 826,858 | 7/1906 | Jones | 192/141 |
| 2,227,114 | 12/1940 | Tear . | |
| 2,778,471 | 1/1957 | Kuhn . | |
| 2,837,925 | 6/1958 | Rowley et al. . | |
| 2,854,113 | 9/1958 | Hallden | 192/143 |
| 2,902,876 | 9/1959 | Pollock . | |
| 3,221,118 | 11/1965 | Hoover . | |
| 4,064,981 | 12/1977 | House et al. | 192/141 |
| 4,479,397 | 10/1984 | Jelinek et al. . | |

Primary Examiner—Kenneth J. Dorner
Assistant Examiner—Gerald A. Anderson

Attorney, Agent, or Firm—Wood, Dalton, Phillips, Mason & Rowe

[57] ABSTRACT

To provide a torque limiting and overtravel stop device for aircraft actuation systems, where the overtravel stop is lightweight, bi-directional, repeatable and on-jamming, and allows for many revolutions of rotation between each end stop, the device includes a drive shaft having an input end and an end disposed in remote relation to the input end. A torque limiter is operatively associated with the drive shaft for rotational movement therewith and includes an input side adapted to receive input torque from the drive shaft and an output side adapted to transmit input torque from the drive shaft. The device includes a driven shaft having an input end driven by said drive shaft and an end disposed in remote relation to the input end with a traveling nut being disposed on the driven shaft for movement between the ends thereof. Gears are operatively related between said drive shaft and said driven shaft to normally provide a relative speed difference between the traveling nut and the driven shaft. The device further includes jaws for stopping movement of the traveling nut at the ends of the driven shaft so as to cause a torque build-up across the torque limiter by reason of the speed difference between the gears and the drive shaft sufficient to cause the torque limiter to prevent rotation of the drive shaft in one rotational direction.

16 Claims, 1 Drawing Sheet

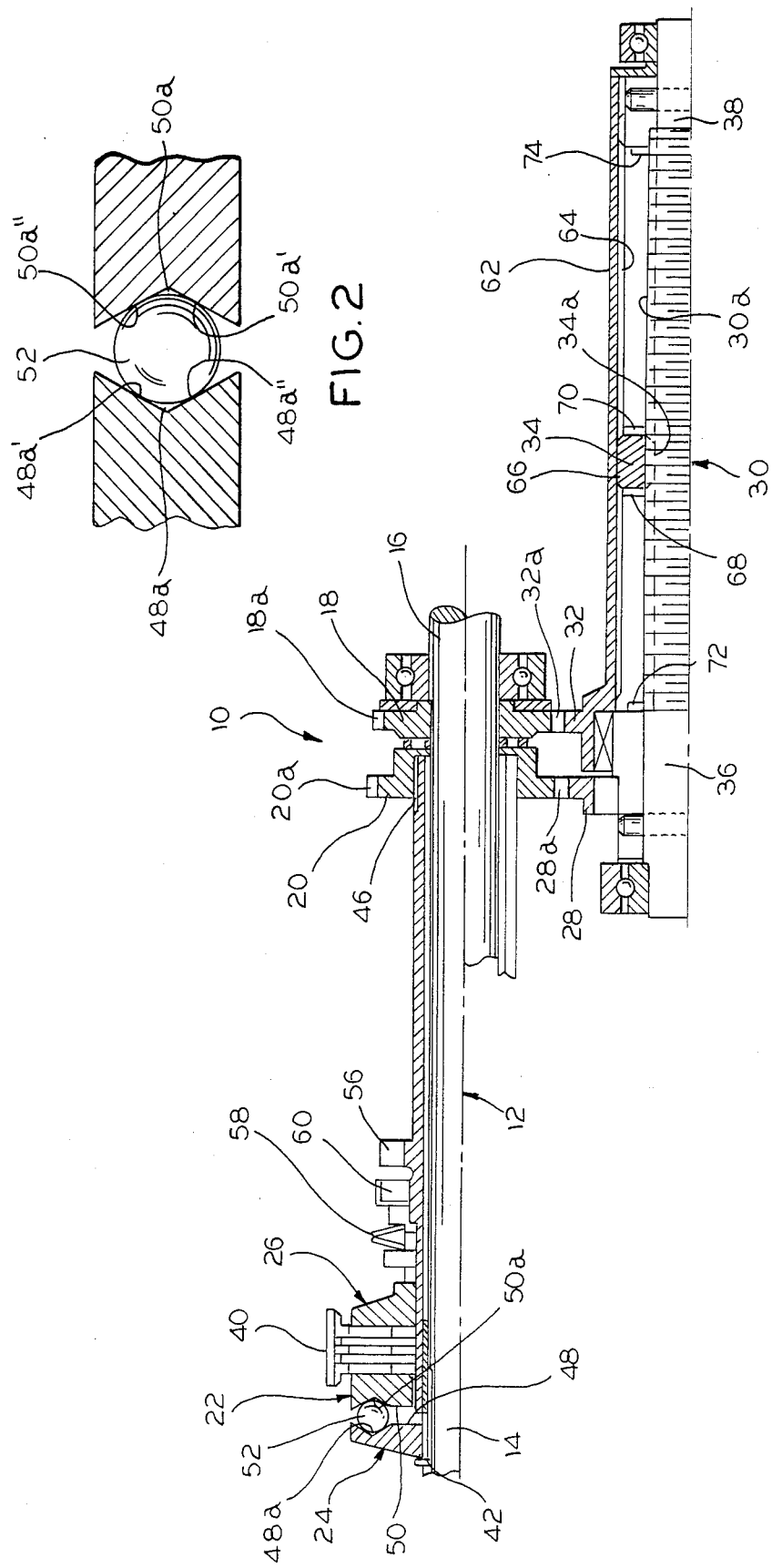

TORQUE LIMITING AND OVERTRAVEL STOP DEVICE

FIELD OF THE INVENTION

The present invention relates to torque limiters and overtravel stops and, more particularly, to a torque limiting and overtravel stop device.

BACKGROUND OF THE INVENTION

In many systems, it is well recognized that overtravel stops are commonly utilized as an important component. For instance, in aircraft actuation systems, overtravel stops which are effective and reliable must be provided in order to assure proper functioning of critical components. Moreover, it is important to provide lightweight, bi-directional, repeatable and non-jamming overtravel stops for such applications.

An additional necessary feature of overtravel stops utilized in aircraft actuation systems includes accommodating numerous revolutions of rotation between each end stop. Frequently, a torque limiting device is also needed as a part of the same system. Accordingly, it would be highly desirable to provide a single device accomplishing both functions with fewer parts.

Among devices disclosed in the prior art are those of Rowley et al, U.S. Pat. No. 2,837,925, and Pollock, U.S. Pat. No. 2,902,876. These devices generally relate to differential type overtravel limit stops. However, neither Rowley et al nor Pollock disclose or suggest the use of any type of torque limiter therewith.

Other devices which have been proposed include those in Hoover, U.S. Pat. No. 3,221,118 and Jelinek et al, U.S. Pat. No. 4,479,397. The devices disclosed therein include overtravel screws with brakes. However, neither Hoover nor Jelinek et al disclose or suggest a torque limiter in combination with an overtravel stop.

The present invention is directed to overcoming the above-stated problems and accomplishing the stated objects in an effective, reliable and efficient manner.

SUMMARY OF THE INVENTION

Accordingly, the present invention is directed to a torque limiting and overtravel stop device useful for many applications, e.g., aircraft actuation systems. The device includes a drive shaft having an input end and an end disposed in remote relation to the input end. A first gear means is integrally associated with the drive shaft for rotational movement therewith and a second gear means is integrally associated with a torque limiting means for rotational movement therewith. The torque limiting means is operatively associated with the drive shaft for rotational movement therewith and includes an input side adapted to receive torque from the drive shaft and an output side adapted to transmit input torque from the drive shaft. The device also includes a driven shaft having an input end and an end disposed in remote relation to the input end. A third gear means is integrally associated with the driven shaft and in engagement with and normally driven by the second gear means and a fourth gear means is operatively associated with a traveling means disposed on the driven shaft for movement between the ends thereof and in engagement with and normally driven by the first gear means. The device further includes means for stopping movement of the traveling means at the ends of the driven shaft. In addition, the first and fourth gear means are operatively related to the second and third gear means so as to normally provide a relative speed difference between the traveling means driven by the first and fourth gear means and the driven shaft driven by the second and third gear means.

In the exemplary embodiment, the traveling means moves toward one end of the driven shaft in response to rotation of the drive shaft in one direction and moves toward the other end of the driven shaft in response to rotation of the drive shaft in the other direction. When the traveling means reaches the movement stopping means at an end of the driven shaft, the movement stopping means causes the third gear means to drive the second gear means and at a slower speed than the drive shaft is causing the first gear means to drive the fourth gear means.

As a result, the second gear means causes a torque build-up across the torque limiting means by reason of the speed difference between the second gear means and the drive shaft. Moreover, the torque build-up is sufficient to cause the torque limiting means to prevent rotation of the drive shaft in one or the other rotational direction.

In the preferred embodiment, the first and second gear means are disposed adjacent the remote end of the drive shaft. It will also be appreciated that the driven shaft will preferably be disposed in generally parallel relation to the drive shaft such that the input end of the driven shaft is disposed adjacent the first and second gear means at the remote end of the drive shaft. With this construction, the third and fourth gear means will be disposed at the input end of the driven shaft in driving engagement with the first and second gear means.

In addition, the torque limiting means advantageously includes means for applying a brake in response to a predetermined torque selected for a given application. Also, the input side of the torque limiting means is integrally associated with the drive shaft and the output side of the torque limiting means is integrally associated with the second gear means, the input and output sides of the torque limiting means having confronting circumferential surfaces, each of which has a plurality of indentations registering with corresponding indentations in the other of the surfaces to normally define generally diamond shaped pockets. With this arrangement, the torque limiting means further includes torque transmitting balls in the registering indentations of the input and output sides thereof.

Preferably, the torque limiting means is formed such that the means for applying a brake includes a disc brake associated with the output side thereof which is applied by a circumferential shift in the relative position of the circumferential surfaces causing the torque transmitting balls to separate the circumferential surfaces. More specifically, the disc brake is engaged by separation of the circumferential surfaces caused by reason of the torque transmitting balls riding up on opposing surfaces of the generally diamond shaped pockets normally defined by the registering indentations to thereby axially separate the circumferential surfaces.

In the preferred embodiment, the output side of the torque limiting means includes output gear means for transmitting input torque from the drive shaft. The torque limiting means also includes spring means normally biasing the output side of the torque limiting means toward the input side thereof. Advantageously, the device is also provided with means for adjusting the torque limiting means to select the predetermined torque at which the brake is applied.

Still additional details of the present invention include the traveling means taking the form of a traveling nut disposed on the driven shaft for movement between the ends thereof. The traveling nut and the driven shaft then have mating threads accommodating the movement. With this construction, the fourth gear means normally drives the traveling nut through a splined tube in coaxial relation to the driven shaft.

Preferably, the movement stopping means includes jaws on opposite ends of the traveling nut and jaws at opposite ends of the driven shaft. The jaws on the traveling nut engage the jaws at one end of the driven shaft when the traveling nut reaches the one end thereof. Similarly, the jaws on the traveling nut engage the jaws at the other end of the driven shaft when the traveling nut reaches the other end thereof.

Other objects, advantages and features of the present invention will become apparent from the following specification taken in conjunction with the accompanying drawings.

BRIEF DESCRIPTION OF THE DRAWINGS

FIG. 1 is a cross-sectional view of a torque limiting and overtravel stop device in accordance with the present invention; and FIG. 2 is a cross-sectional view illustrating a detail of the torque limiting component.

DETAILED DESCRIPTION OF THE PREFERRED EMBODIMENT

Referring to FIGS. 1 and 2, an exemplary embodiment of a torque limiting and overtravel stop device in accordance with the invention is illustrated. The device 10 includes a drive shaft 12 having an input end 14 and an end 16 disposed in remote relation to the input end 14. A first gear means 18 is integrally associated with the drive shaft 12 for rotational movement therewith and a second gear means 20 is integrally associated with a torque limiting means 22 for rotational movement therewith. The torque limiting means 22 is operatively associated with the drive shaft 12 for rotational movement therewith and includes an input side 24 adapted to receive input torque from the drive shaft 12 and an output side 26 adapted to transmit input torque from the drive shaft 12. A third gear means 28 is integrally associated with a driven shaft 30 and in engagement with and normally driven by the second gear means 20 and a fourth gear means 32 is operatively associated with traveling means such as the traveling nut 34 and in engagement with and normally driven by the first gear means 18. The driven shaft 30 has an input end 36 and an end 38 disposed in remote relation to the input end 36 and the traveling nut 34 is disposed on the driven shaft 30 for movement between the ends 36 and 38 thereof. Further, the device 10 includes means for stopping movement of the traveling nut 34 at the ends 36 and 38 of the driven shaft 30, as will described in detail hereinafter.

As will be appreciated, the first and fourth gear means 18 and 32 are operatively related to the second and third gear means 20 and 28 so as to normally provide a relative speed difference between the traveling nut 34 driven by the first and fourth gear means 18 and 32 and the driven shaft 30 driven by the second and third gear means 20 and 28. The relative speed difference causes the traveling nut 34 to move toward one end, such as 36, in response to rotation of the drive shaft 12 in one direction, such as counterclockwise and to move toward the other end, such as 38, in response to rotation of the drive shaft 12 in the other direction, such as clockwise. When the traveling nut 34 reaches either end 36 or 38 of the driven shaft 30, the movement stopping means causes the third gear means 28 to drive the second gear means 20 and at a slower speed than the drive shaft 12 is causing the first gear means 18 to drive the fourth gear means 32.

As will be appreciated, the second gear means 20 causes a torque build-up across the torque limiting means 22 by reason of the speed difference between the second gear means 20 and the drive shaft 12. Moreover, the torque build-up is sufficient to cause the torque limiting means 22 to prevent rotation of the drive shaft 12 in one rotational direction, i.e., either clockwise or counterclockwise, depending upon the directon of rotation of the drive shaft 12 immediately preceding the torque build-up.

As shown in FIG. 1, the first and second gear means 18 and 20 are disposed adjacent the remote end 16 of the drive shaft 12, and the driven shaft 30 is disposed in generally parallel relation to the drive shaft 12 with the input end 36 disposed adjacent the first and second gear means 18 and 20. Also, as shown, the third and fourth gear means 28 and 32 are disposed at the input end 36 of the driven shaft 30. Moreover, the various gear means are arranged such that the first and fourth gear means 18 and 32 and the second and third gear means 20 and 28 have respective first and fourth sets of intermeshing teeth 18a and 32a and second and third sets of intermeshing teeth 20a and 28a in gear driving relation.

Still referring to FIG. 1, the torque limiting means 22 includes means for applying a brake 40 in response to a predetermined torque. The input side 24 of the torque limiting means 22 is integrally associated with the drive shaft 12 by any conventional means such as mating splines as at 42. Also, the output side 26 of the torque limiting means 22 is integrally associated with the second gear means 20 by means such as an axially extending tube 44 disposed in coaxial relation to the drive shaft 12 and through mating splines as at 46. Further, the input and output sides 24 and 26 have respective circumferential surfaces 48 and 50 in spaced apart confronting relation. The input side 24 is disposed relative to the output side 26 such that the surfaces 48 and 50 each have a plurality of sets of indentations 48a and 50a. With this arrangement, the torque limiting means 22 utilizes a torque transmitting ball 52 in each of the sets of registering indentations 48a and 50a (see, also, FIG. 2).

Referring specifically to FIG. 1, the brake 40 is preferably a disc brake. The disc brake 40 is associated with the output side 26 of the torque limiting means 22 and is applied by a circumferential shift in the relative position of the circumferential surfaces 48 and 50. As will be appreciated, the circumferential shift causes the torque transmitting balls 52 to separate the circumferential surfaces 48 and 50.

More particularly, the disc brake 40 is engaged by separation of the circumferential surfaces 48 and 50 caused by the circumferential shift therebetween. The torque transmitting balls 52 cause the circumferential surfaces 48 and 50 to axially separate by riding up on opposing surfaces 48a', 50a' or 48a", 50a" of the registering sets of indentations 48a and 50a. As shown in FIG. 2, the registering sets of indentations 48a and 50a normally define generally diamond shaped pockets 54.

Referring again to FIG. 1, the output side 26 of the torque limiting means 22 includes output gear means 56 for transmitting input torque from the drive shaft 12 to a device to be driven thereby. The torque limiting means 22 also includes spring means such as the spring 58 normally biasing the output side 26 of the torque limiting means 22 toward the input side 24 thereof. Additionally, an adjusting nut 60 comprises means for adjusting the torque limiting means 22 to select the predetermined torque at which the disc brake 40 is applied.

As previously mentioned, the traveling nut 34 is disposed on the driven shaft 30 for movement between the ends 36 and 38 thereof. The traveling nut 34 and the driven shaft 30 have mating threads 34a and 30a accommodating the movement. With this construction, the fourth gear means 32 normally drives the traveling nut 34 through a splined tube 62 generally coaxial with the driven shaft 30.

More specifically, the tube 62 is splined as at 64 and the traveling nut 34 is splined as at 66 with the tube 62 being integral with the fourth gear means 32 so as to be driven thereby. The traveling nut 34 will be driven through the mating splines 64 and 66 when the drive shaft 12 causes the first gear means 18 to drive the fourth gear means 32 through the meshing gear teeth 18a and 32a. Due to the mating threads 34a and 30a, the traveling nut 34 will be driven along the driven shaft 30 either toward the end 36 or the end 38 depending upon the direction of rotation of the drive shaft 12.

Referring to FIG. 1, the movement stopping means includes jaws 68 and 70 on opposite ends of the traveling nut 34 and jaws 72 and 74 at opposite ends of the driven shaft 30. The jaw 68 on the traveling nut 34 engages the jaw 72 at the one end 36 of the driven shaft 30 when the traveling nut 34 reaches the one end 36 thereof. Similarly, the jaw 70 on the traveling nut 34 engages the jaw 74 at the other end 38 of the driven shaft 30 when the traveling nut 34 reaches the other end 38 thereof.

While the device 10 has been shown utilizing a typical ball ramp type of torque limiting means 22, it will be understood that any torque limiting means can be provided. The type of torque limiting means illustrated is particularly applicable to aircraft actuation systems, e.g., flap actuators and the like. Accordingly, the only limitation is that the device 10 be provided with a torque limiter that can be combined with an overtravel stop in accordance with the invention.

As will be appreciated, the device 10 utilizes a differential gearing arrangement in the embodiment illustrated. The traveling nut stop arrangement is connected to both the input and output sides of the torque limiting means which is a device that, when a predetermined amount of torque is applied to its output, the disc brake 40 will be actuated to stop rotation. Since rotation will be stopped through a torque limiter trip, any additional torque will be prevented from being applied to the output side once this occurs.

Oftentimes, it is desired to limit rotation of the drive shaft 12 to a selected number of revolutions. In the normal operating mode, the first gear means 18 drives the fourth gear means 32 and the second gear means 20 drives the third gear means 28. The second gear means 20 is driven from the output side 26 of the torque limiting means 22 through the tube 44, and the third gear means 28 drives the driven shaft 30 which has external threads 30a and the fourth gear means 32 drives the traveling nut 34 through the mating splines 64 and 66 by means of the splined tube 62. In the normal operating mode, a desired relative speed difference between the traveling nut 34 and the driven shaft 30 can be obtained by the proper selection of gear teeth 18a, 20a, 28a and 32a. As will be appreciated, the relative speed difference causes the traveling nut 34 to move toward the one end 36 or the other end 38 of the driven shaft 30, depending upon input rotation direction.

When the limits of rotation are reached, either the jaw 68 will engage the jaw 72 or the jaw 70 will engage the jaw 74 (depending on input rotation direction, i.e., the direction of rotation of the drive shaft 12). When either of the sets of jaws 68, 72 or 70, 74 are engaged, the second gear means 20 will be driven by the third gear means 28 as a result of the meshing gear teeth 20a and 28a through the driven shaft 30, traveling nut 34, splined tube 62, third gear means 32, first gear means 18, and drive shaft 12, but at a slower rotational speed than the drive shaft 12. Because of the relative speed difference, there is a torque build-up from the input side 24 across the output side 26 of the torque limiting means 22 sufficient to prevent any further rotation of the drive shaft 12 in the same direction by activating a conventional torque limiter trip.

When neither the jaws 68 and 72 nor the jaws 70 and 74 are engaged, the torque limiting means 22 operates in a normal fashion limiting the torque transmitted to the output gear means 56.

By using the torque limiting device as an overtravel stop device, many more turns of the drive shaft can be allowed for in a given space. Moreover, the dual use of the torque limiting device is advantageous, as well. Furthermore, the device is characterized by less timing requirements than that of other differentially driven overtravel stops.

While in the foregoing there has been set forth a preferred embodiment of the invention, it will be understood that the invention is only to be limited by the spirit and scope of the appended claims.

I claim:

1. A torque limiting and overtravel stop device, comprising:

a drive shaft having an input end and an end disposed in remote relation to said input end;

first gear means integrally associated with said drive shaft for rotational movement therewith;

torque limiting means operatively associated with said drive shaft for rotational movement therewith, said torque limiting means including an input side adapted to receive input torque from said drive shaft, said torque limiting means also including an output side adapted to transmit input torque from said drive shaft;

second gear means integrally associated with said torque limiting means for rotational movement therewith;

a driven shaft having an input end and an end disposed in remote relation to said input end;

traveling means disposed on said driven shaft for movement between said ends thereof;

third gear means integrally associated with said driven shaft and in engagement with and normally driven by said second gear means;

fourth gear means operatively associated with said traveling means and in engagement with and normally driven by said first gear means;

said first and fourth gear means being operatively related to said second and third gear means so as to normally provide a relative speed difference between said traveling means driven by said first and fourth gear means and said driven shaft driven by said second and third gear means; and means for stopping movement of said traveling means at said ends of said driven shaft, said traveling means moving toward one end of said driven shaft in response to rotation of said drive shaft in one direction, said traveling means moving toward the other end of said driven shaft in response to rotation of said drive shaft in the other direction;

said movement stopping means causing said third gear means to drive said second gear means and at a slower speed than said drive shaft is causing said first gear means to drive said fourth gear means;

said second gear means causing a torque build-up across said torque limiting means, said torque build-up being caused by the speed difference between said second gear means and said drive shaft, said torque build-up being sufficient to cause said torque limiting means to prevent rotation of said drive shaft in one rotational direction.

2. The torque limiting and overtravel stop device as defined by claim 1 wherein said first and second gear means are disposed adjacent said remote end of said drive shaft, said driven shaft being disposed in generally parallel relation to said drive shaft, said input end of said driven shaft being disposed adjacent said first and second gear means and said third and fourth gear means being disposed at said input end of said driven shaft.

3. The torque limiting and overtravel stop device as defined by claim 1 wherein said torque limiting means includes means for applying a brake in response to a predetermined torque, said input side of said torque limiting means being integrally associated with said drive shaft and said output side of said torque limiting means being integrally associated with said second gear means.

4. The torque limiting and overtravel stop device as defined by claim 3 wherein said input and output sides of said torque limiting means have confronting circumferential surfaces, each of said surfaces having a plurality of indentations registering with corresponding indentation in the other of said surfaces and including torque transmitting balls in said registering indentations.

5. The torque limiting and overtravel stop device as defined by claim 4 wherein said means for applying a brake includes a disc brake associated with said output side of said torque limiting means, said disc brake being applied by a circumferential shift in the relative position of said circumferential surfaces causing said torque transmitting balls to separate said circumferential surfaces.

6. The torque limiting and overtravel stop device as defined by claim 5 wherein said disc brake is engaged by separation of said circumferential surfaces, said torque transmitting balls causing said circumferential surfaces to axially separate by riding up on opposing surfaces of said registering indentations, said registering indentations defining generally diamond shaped pockets.

7. The torque limiting and overtravel stop device as defined by claim 5 wherein said output side of said torque limiting means includes output gear means for transmitting input torque from said drive shaft, said torque limiting means also including spring means normally biasing said output side of said torque limiting means toward said input side thereof and including means for adjusting said torque limiting means to select said predetermined torque.

8. The torque limiting and overtravel stop device as defined by claim 1 wherein said traveling means includes a traveling nut disposed on said driven shaft for movement between said ends thereof, said traveling nut and said driven shaft having mating threads accommodating said movement and said fourth gear means normally driving said traveling nut through a splined tube generally coaxial with said driven shaft.

9. The torque limiting and overtravel stop device as defined by claim 8 wherein said movement stopping means includes jaws on opposite ends of said traveling nut and jaws at opposite ends of said driven shaft, said jaws on said traveling nut engaging said jaws at one end of said driven shaft when said traveling nut reaches the one end thereof, said jaws on said traveling nut engaging said jaws at the other end of said driven shaft when said traveling nut reaches the other end thereof.

10. A torque limiting and overtravel stop device comprising:

a drive shaft having an input end and an end disposed in remote relation to said input end;

first gear means integrally associated with said drive shaft for rotational movement therewith, said first gear means being disposed adjacent said remote end of said drive shaft;

torque limiting means operatively associated with said drive shaft for rotational movement therewith, said torque limiting means including an input side adapted to receive input torque from said drive shaft, said torque limiting means also including an output side adapted to transmit input torque from said drive shaft, said torque limiting means including means for applying a brake in response to a predetermined torque;

second gear means integrally associated with said output side of said torque limiting means for rotational movement therewith, said second gear means being disposed adjacent said remote end of said drive shaft;

a driven shaft having an input end and an end disposed in remote relation to said input end, said input end being disposed adjacent said first and second gear means, said driven shaft being disposed in generally parallel relation to said drive shaft;

a traveling nut disposed on said driven shaft for movement between said ends thereof, said traveling nut and said driven shaft having mating threads accommodating said movement;

third gear means integrally associated with said driven shaft and in engagement with and normally driven by said second gear means, said third gear means being disposed at said input end of said driven shaft;

fourth gear means operatively associated with said traveling nut and in engagement with and normally driven by said first gear means, said fourth gear means being disposed at said input end of said driven shaft;

said first and fourth gear means being operatively related to said second and third gear means so as to normally provide a relative speed difference between said traveling nut and said driven shaft;

said fourth gear means normally driving said traveling nut for movement between said ends of said driven shaft through a splined tube, said splined tube being generally coaxial with said driven shaft, said splined tube having an internal spline engaging with a corresponding external spline on said traveling nut; and means for stopping movement of said traveling nut at said ends of said driven shaft, said traveling nut moving toward one end of said driven shaft in response to rotation of said drive shaft in one direction, said traveling nut moving toward the other end of said driven shaft in response to rotation of said drive shaft in the other direction;

said movement stopping means causing said third gear means to drive said second gear means and at a slower speed than said drive shaft is causing said first gear means to drive said fourth gear means;

said second gear means causing a torque build-up from said input side across said output side of said torque limiting means, said torque build-up being caused by the speed difference between said second gear means and said drive shaft, said torque build-up being sufficient to apply said brake means to prevent rotation of said drive shaft in one rotational direction.

11. The torque limiting and overtravel stop device as defined by claim 10 wherein said means for applying a brake is operative in response to a predetermined torque, said input side of said torque limiting means being integrally associated with said drive shaft, said output side of said torque limiting means being integrally assocrated with said second gear means.

12. The torque limiting and overtravel stop device as defined by claim 11 wherein said input and output sides of said torque limiting means have confronting circumferential surfaces, each of said surfaces having a plurality of indentations registering with corresponding indentations in the other of said surfaces and including torque transmitting balls in said registering indentations.

13. The torque limiting and overtravel stop device as defined by claim 12 wherein said means for applying a brake includes a disc brake associated said output side of said torque limiting means, said disc brake being applied by a circumferential shift in the relative position of said circumferential surfaces causing said torque transmitting balls to separate said circumferential surfaces.

14. The torque limiting and overtravel stop device as defined by claim 13 wherein said disc brake is engaged by separation of said circumferential surfaces, said torque transmitting balls causing said circumferential surfaces to axially separate by riding up on opposing surfaces of said registering indentations, said registering indentations defining generally diamond shaped pockets.

15. The torque limiting and overtravel stop device as defined by claim 13 wherein said output side of said torque limiting means includes output gear means for transmitting input torque from said drive shaft, said torque limiting means also including spring means normally biasing said output side of said torque limiting means toward said input side thereof and including means for adjusting said torque limiting means to select said predetermined torque.

16. The torque limiting and overtravel stop device as defined by claim 10 wherein said movement stopping means includes jaws on opposite ends of said traveling nut and jaws at opposite ends of said driven shaft, said jaws on said traveling nut engaging said jaws at one end of said driven shaft when said traveling nut reaches the one end thereof, said jaws on said traveling nut engaging said jaws at the other end of said driven shaft when said traveling nut reaches the other end thereof.

* * * * *